(12) United States Patent
Schneider et al.

(10) Patent No.: US 7,293,148 B2
(45) Date of Patent: Nov. 6, 2007

(54) METHOD FOR RELIABLY VERIFYING A MEMORY AREA OF A MICROCONTROLLER IN A CONTROL UNIT AND CONTROL UNIT HAVING A PROTECTED MICROCONTROLLER

(75) Inventors: Klaus Schneider, Ludwigsburg (DE); Axel Aue, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/534,372

(22) PCT Filed: Nov. 5, 2003

(86) PCT No.: PCT/DE03/03692

§ 371 (c)(1),
(2), (4) Date: Nov. 14, 2005

(87) PCT Pub. No.: WO2004/042592

PCT Pub. Date: May 21, 2004

(65) Prior Publication Data

US 2006/0117131 A1     Jun. 1, 2006

(30) Foreign Application Priority Data

Nov. 7, 2002     (DE) .............................. 102 51 839

(51) Int. Cl.
*G06F 12/14*     (2006.01)
(52) U.S. Cl. ................. 711/164; 726/26; 726/30; 711/100; 711/103; 711/154; 701/1; 701/29; 701/31; 700/9; 700/78; 700/79; 700/81
(58) Field of Classification Search ............... None
See application file for complete search history.

(56) References Cited

U.S. PATENT DOCUMENTS 5,278,759 A * 1/1994 Berra et al. .................. 701/1

(Continued)

FOREIGN PATENT DOCUMENTS

| DE | 197 23 332 | 9/1998 |
|---|---|---|
| DE | 197 53 730 | 6/1999 |
| EP | 1 197 826 | 4/2002 |

OTHER PUBLICATIONS

Ellims, M. et al, 'Is Security Necessary for Safety?', SCAR '07, Berlin, Nov. 14-15, 2007, entire document, http://www.pitechnology.com/uploads/documents/security_and_safety.pdf.*

*Primary Examiner*—Nasser Moazzami
*Assistant Examiner*—Ronald Baum
(74) *Attorney, Agent, or Firm*—Kenyon & Kenyon LLP

(57) ABSTRACT

A method is provided for controlling a microcontroller in a control unit in a motor vehicle, having a processor core, at least one read-only memory area and at least one rewritable memory area, at least one control program which is intended to be processed by the processor core being stored in the rewritable memory area. In order to provide a method for controlling a microcontroller in a control unit that better protects the verification of memories of the microcontroller against unauthorized intervention, a verification program is stored in a write-once memory area of the rewritable memory area and a service program is stored in the read-only memory area. The verification program is called by the control program via the service program at regular intervals and verifies at least part of the rewritable memory area. In addition, the service program resets a counter. A RESET of the control unit is triggered by the verification program when manipulation of the verified memory area is detected or by the counter in the event of counter overflow.

5 Claims, 2 Drawing Sheets

U.S. PATENT DOCUMENTS 5,657,224 A * 8/1997 Lonn et al. .................... 701/29
5,936,315 A * 8/1999 Lais .......................... 307/10.1
6,286,101 B1 9/2001 Suzuki
6,535,811 B1 * 3/2003 Rowland et al. ............ 701/115
6,625,688 B1 * 9/2003 Fruehling et al. ............ 711/109
6,877,114 B2 * 4/2005 Allen et al. .................... 714/45
7,003,495 B1 * 2/2006 Burger et al. ................. 705/50
2002/0052193 A1 * 5/2002 Chetty ........................ 455/412

\* cited by examiner

METHOD FOR RELIABLY VERIFYING A MEMORY AREA OF A MICROCONTROLLER IN A CONTROL UNIT AND CONTROL UNIT HAVING A PROTECTED MICROCONTROLLER

The present invention relates to a method for controlling a microcontroller in a control unit in a motor vehicle, having a processor core, at least one read-only memory area and at least one rewritable memory area, at least one control program which is intended to be processed by the processor core being stored in the rewritable memory area.

The present invention further relates to such a control unit for a motor vehicle having a microcontroller.

BACKGROUND INFORMATION

Automobiles are understood herein as being in the widest sense vehicles with an internal combustion engine that is controllable by control units. Such control units are used in automotive engineering for a variety of functions, for example as engine control units. In chip-tuning of engine control units, for example, frequently the non-volatile but repeatedly writable memory (e.g. flash) is manipulated. The data stored therein are altered in such a way that greater engine power is obtained. Methods for controlling the microcontroller are also known from the related art, which methods activate verification routines at start-up and/or during the run time of the control unit program. Such control units are furthermore also used for controlling transmission systems or ABS systems.

A method and a device for controlling an internal combustion engine are known from German laid open print No. 197 53 730. The device includes at least one microprocessor, at least one programmable memory and a rewritable memory. Programs and/or data processed by the microprocessor are stored in the rewritable memory. The programs are executed only after they have been checked. If the contents of a programmable memory assume a first value, the program is executed without further checking; otherwise, at least one further check is carried out. The purpose of that method is to ensure that a data set that contains altered data and/or programs or that has not been released by the manufacturer of the control unit is executable on a series control unit. At the same time, the motor vehicle manufacturer is to have the possibility of customizing control units, that is to say, of altering data sets in individual control units, without having knowledge of the checks. Protection of the contents of the programmable memory presents problems in that case.

German Patent No. 197 23 332 describes a method for protecting a microcomputer against manipulation of its program and a microcomputer protected in that manner. The microcomputer has a processor core, a read-only memory and a rewritable memory. In the read-only memory, a verification program is stored that constructs a code word from the memory contents of the rewritable memory using a key. The code word is then compared with a comparison code word which is also stored in the rewritable memory. Depending on that comparison, the microcomputer is disabled or enabled.

In the case of the known methods, even when a protected, internal flash area is used, protection is possible only if the application requires only that area and no external memory. Since, however, the applications usually make use of an external memory, the built-in manipulation protection does not work in those applications—or, rather, it is possible to circumvent it. Furthermore, manipulation of the verification routines is possible if controllers not having internal, protected memories are used. In the simplest case, calling of those routines is prevented.

If, on the other hand, those verification routines are stored in a non-alterable area in the controller (e.g. in ROM), this on the one hand means an increase in costs and on the other hand means less flexibility in the choice of algorithms. Moreover, a ROM is often not obtainable in the corresponding controller technology. Even if a ROM is available, the problems that have to be taken into account as a general principle when using a large ROM area remain. Changing the program code is very expensive, since new masks are required in each case. If code has to be changed, it takes at least 4 months before the new code can be used in the project (line throughput time). In the case of a customer-specific code, either every customer needs his own ROM or the ROM has to be made correspondingly larger. Both result in additional costs, which are not in the interests of the customer or of the semiconductor manufacturer. Here too, the issue of how the execution of the code may be forced remains unresolved.

The problem underlying the present invention therefore resides in providing a method for verifying memories of a microcontroller in a control unit, which method affords better protection against unauthorized intervention. The object is further to prevent more effectively the unauthorized manipulation of memory contents in the case of a microcontroller in a control unit.

SUMMARY OF THE INVENTION

The method according to the present invention includes the following steps: storing a verification program in a write-once memory area of the rewritable memory area, storing a service program in the read-only memory area, calling the service program by the control program at regular intervals, calling the verification program by the service program, resetting a counter by the service program when called by the control program, verifying at least part of the rewritable memory area by the verification program, triggering a RESET by the verification program in the event of manipulation of the verified memory area or by the counter in the event of counter overflow.

The method according to the present invention is distinguished by the fact that it is not possible to manipulate the code sequence for verifying the memory (the verification program) in the write-once-only memory. Such a write-once-only memory area may be obtained, for example, in the existing, internal rewritable memory (flash). A number of microcontrollers have, for example, password protection applied to parts of the internal flash. Secondly, in the method according to the invention, the execution of that code sequence is also effectively ensured. The respective control program of the control unit must contain a call to the verification program at regular intervals, which intervals may be variable. The verification program is called by a service program which is stored in the read-only memory. That service program is therefore protected against unauthorized intervention and manipulation.

That service program must be called regularly, since otherwise a counter, which runs continuously and uninfluencibly using a clock pulse supply, will signal an overflow.

It is not possible to stop the counter, and resetting thereof is possible only by calling the service program. If the counter reaches overflow before the service program is called, the counter generates a RESET of the microcontroller.

The counter may be implemented in the form of a separate counter component that has its own clock pulse supply and that is disposed in a protected area within the microcontroller or in the control unit. Equally, in suitable microcontrollers, implementation in program form is possible. Counter overflow may be triggered, for example, as a result of the counter end being reached. The time at which overflow is reached determines the time interval after which the service program must be called again without the counter triggering a RESET. To set a time, a counter having an appropriate counter end is selected or a counter reading is set which, when reached, similarly signals an overflow. When the service program is called by the control program, on the one hand the verification program is called and, on the other hand, the counter is reset.

The RESET may, for example, take the form of the control unit being shut down or being operated with a data set that still permits limited operation. At the same time, a corresponding signal may also be sent to other control units. In particular, it is expedient for a warning signal to be given, which triggers a request for the vehicle to be repaired at a garage.

The object of the present invention is furthermore also achieved by a control unit for a motor vehicle having a microcontroller, in which a write-once memory area of the rewritable memory area is provided for storing a verification program, the read-only memory area is provided for storing a service program, the processor core processes the service program after calling by the control program at regular intervals, the processor core processes the verification program after calling by the service program, a counter is provided which is resettable by the service program when called by the control program, at least part of the rewritable memory area is verifiable by the verification program, a RESET is triggerable by the verification program in the event of manipulation of the verified memory area or in the event of counter overflow.

Especially preferred forms of the present invention are also specified in the dependent claims.

BRIEF DESCRIPTION OF THE DRAWINGS

An exemplary embodiment of the present invention is described in detail below with reference to two drawings, in which.

DETAILED DESCRIPTION OF THE INVENTION

Figure 1:
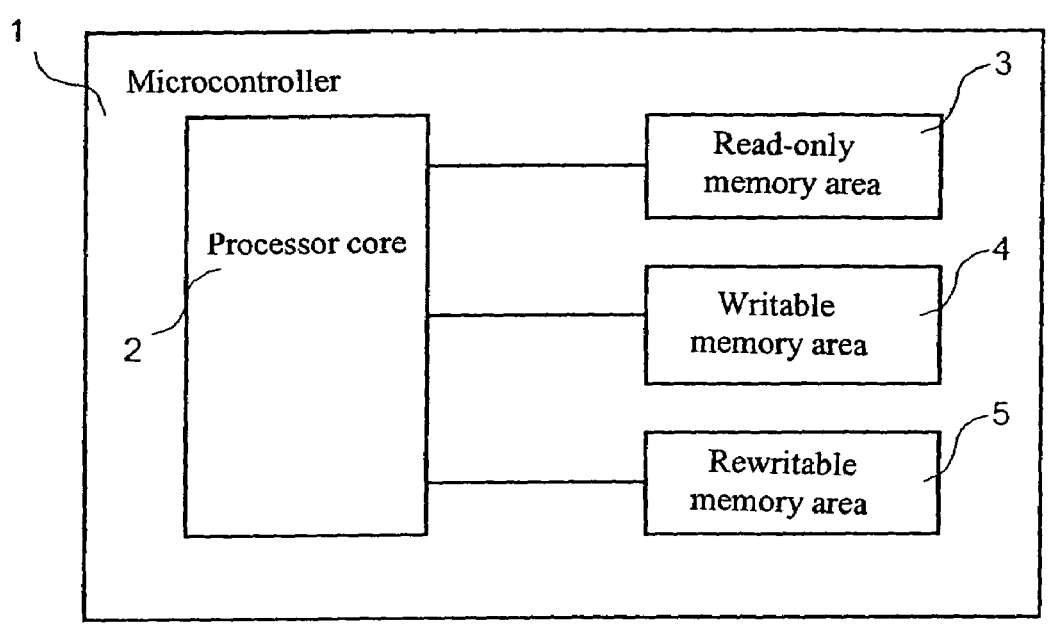
FIG. 1 is a block diagram of a microcontroller according to the invention for a control unit and FIG. 2 is a flow chart of the method according to the invention.

In FIG. 1, a microcontroller 1 for a control unit according to the invention is shown. It includes a processor core 2, a read-only memory 3, a write-once-only memory 4 and a rewritable memory 5. The control unit may, for example, be an engine control unit for controlling throttle valve, quantity of fuel to be injected or other variables. A control unit for controlling a transmission system, an ABS system or other systems in the motor vehicle is also perfectly conceivable, however. Processor core 2 is a conventional microprocessor for processing the stored programs and data. Read-only memory or ROM 3 contains a permanently stored program which may be changed only by replacing ROM 3. There is usually stored in that memory a minimal program that enables processor core 2 to process programs and data from the other memories.

Rewritable memory 5 is usually in the form of EPROM or flash-EPROM and contains alterable programs and data of the control unit. Write-once-only memory 4 is a password-protected memory area of rewritable memory 5 (flash). A code sequence is stored in that memory area 4, which has the function of verifying the code and data areas of microcontroller 1. When manipulation is detected, that verification program takes a countermeasure, which usually takes the form of a RESET being triggered. The extent of the RESET may be adapted to the particular countermeasure desired. For example, the control unit may be completely shut down, which in the case of an engine control unit will result in the vehicle immediately coming to a standstill. Alternatively, the control unit may be provided with a minimal configuration, so that the control unit remains operational but repair at a garage is required for full operability.

The various memory areas are shown separated in FIG. 1 merely with the intention of indicating their differing functions. While maintaining differing functionality, it is possible for the memory areas to be implemented by separate components or in shared components. For example, flash memory 5, in particular, may be implemented both within the microcontroller component and as an external memory component.

Figure 2:
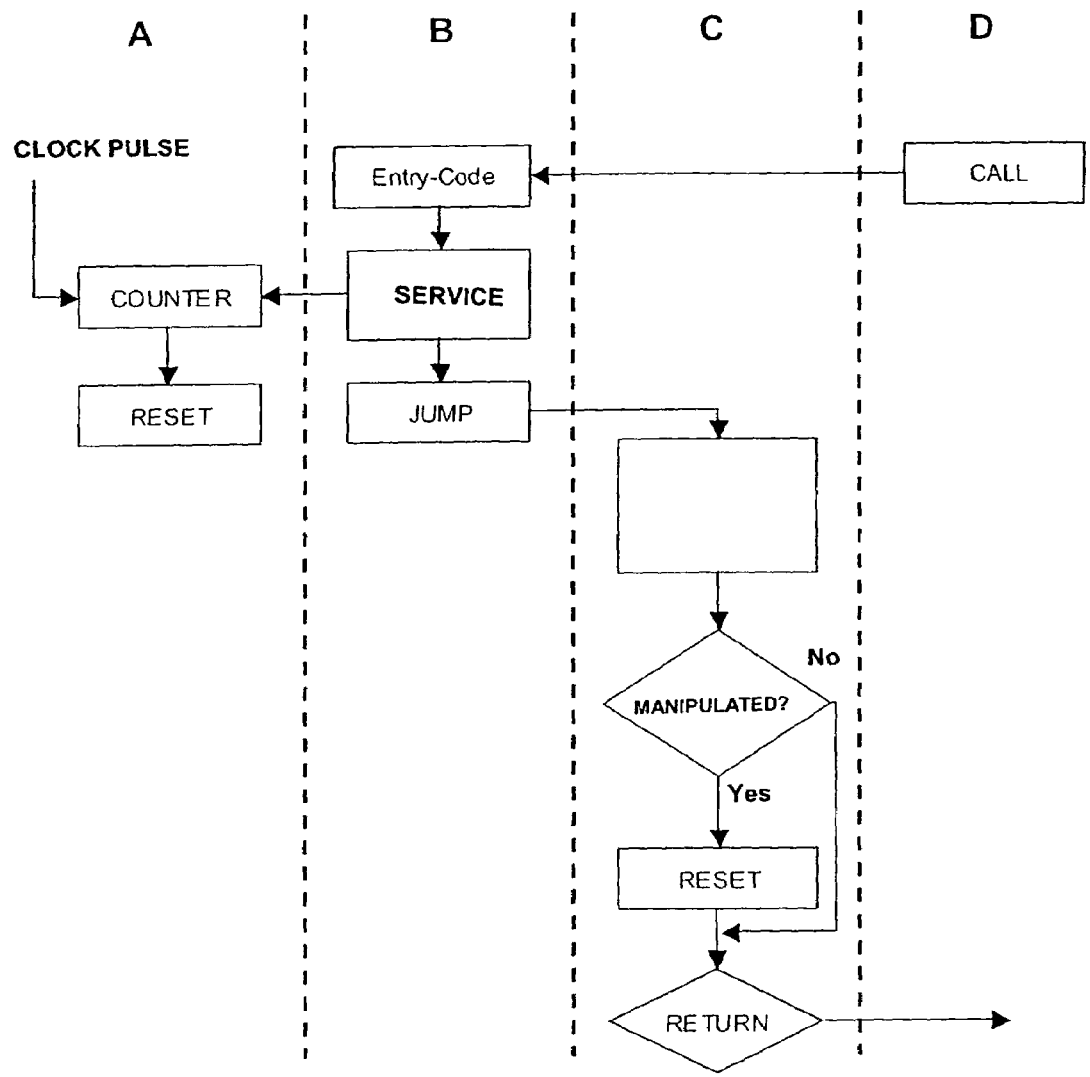

In FIG. 2, the sequence of the method according to the invention is shown schematically. Areas A, B, C and D denote the functionally differing memory areas in which the respective programs and data are stored. In the exemplary embodiment illustrated, A describes a hardware area in the microcontroller, B a ROM area in the microcontroller and C a flash area in the microcontroller, whilst D represents an external flash memory area.

A control program for the control unit is stored as application code in external flash D. The program contains in the code a "CALL" instruction with which a service program stored in the ROM memory area B of the microcontroller is called. With an appropriate entry code, a "SERVICE" is triggered in the service program. That service program causes two things to occur: firstly, a "COUNTER", which is implemented in the form of a counter component in microcontroller A, is reset. The counter component is connected to a clock line and therefore runs continuously regardless. When a maximum count is reached, an overflow is signaled. Secondly, and simultaneously, a "JUMP" is caused to a verification program. That verification program is stored as code sequence in the write-once-only memory area in the internal flash. The internal flash of the microcontroller has for that purpose an area that is protected by a password and which therefore may be written to only once.

The verification program verifies at least part of the memory used by the microcontroller, using known test methods, such as, for example, checksumming. If, on the basis of the verification, manipulation of the stored data and/or programs is detected, a RESET is triggered. If no unauthorized alteration is detected, the method returns to the control program again via a "RETURN" instruction.

If the counter signals an overflow, that is to say, if a defined period has elapsed, a RESET is similarly triggered. That RESET may optionally mean that the control unit is shut down completely or that the control unit is operated using previously defined parameters. The latter option involves a minimal configuration that still ensures functionality of the control unit but which necessitates immediate repair at a garage. The RESET remains active until the device is switched off and switched on again (so-called power-on RESET).

Since the counter runs continuously regardless, the reaching of an overflow and the RESET of the control unit which the latter entails may be prevented only by regular resetting of the counter. Since that may be triggered only by the service program in the similarly non-manipulable ROM area B, the service program must in turn be called regularly by the control program. The control program, which has to contain the "CALL" instruction, may therefore be stored in the relatively unprotected flash area D since, using this method, it is not possible for verification of the memory of the microcontroller to be prevented even by manipulation. Only in the case of non-manipulated memories of the microcontroller is permanent functionality of the control unit ensured.

The method according to the present invention offers a number of advantages over known methods. For example, only very low additional costs, if any, arise for the controller chip, since only minimum additional work is required. Furthermore, the verification program may be individually adapted to needs or requirements since this code sequence is not contained in the ROM mask. It may also, therefore, be kept customer-specific. Moreover, the manufacturer of the controller is able to offer that functionality to other customers also.

The same method may be applied to systems not having controller-internal flash. That method therefore eliminates the disadvantage of a lower degree of protection for systems having internal and external flash and is, in combination with a pairing of components, a very reliable method. Although the rewritable memory area is inside the microcontroller in the case of the above exemplary embodiment, it may, of course, also be outside it.

LIST OF REFERENCE NUMERALS 1 microcontroller
2 processor core
3 read-only memory area
4 writable memory area
5 rewritable memory area

What is claimed is:

1. A method for controlling a microcontroller in a control unit in a motor vehicle having a processor core containing at least one read-only memory area, and at least one rewritable memory area, at least one control program that is intended to be processed by the processor core being stored in the rewritable memory area, the method comprising:
    storing a verification program in a write-once memory area of the rewritable memory area;
    storing a service program in the read-only memory area;
    calling the service program by the control program at regular intervals;
    calling the verification program by the service program;
    resetting a counter by the service program when called by the control program;
    verifying at least part of the rewritable memory area by the verification program;
    triggering a reset one of by the verification program in the event of manipulation of the verified memory area and by the counter in the event of counter overflow.

2. The method of claim 1, wherein the triggering the reset includes triggering a reset of the microcontroller.

3. The method of claim 1, wherein the triggering the reset includes at least one of shutting down the control unit, and operating the control unit in a limited operation mode.

4. The method of claim 1, wherein the triggering the reset includes at least one of sending a signal to other control units, and sending a warning signal which triggers a request for the vehicle to be repaired.

5. The method of claim 1, wherein the write-once memory area includes a password-protected memory area of the rewritable memory area.

* * * * *